United States Patent [19]

Rossié et al.

[11] Patent Number: 5,048,574
[45] Date of Patent: Sep. 17, 1991

[54] SYSTEM FOR THE STORAGE AND SEPARATION OF BOBBIN FORMERS

[75] Inventors: Sven Rossié, Ingolstadt; Robert Braun, Pförring; Franz Seitz, Ingolstadt; Michael Strobel, Eichstätt, all of Fed. Rep. of Germany

[73] Assignee: Schubert & Salzer Maschinenfabrik Aktiengesellschaft, Ingolstadt, Fed. Rep. of Germany

[21] Appl. No.: 508,249

[22] Filed: Apr. 11, 1990

[30] Foreign Application Priority Data

Apr. 12, 1989 [DE] Fed. Rep. of Germany ....... 3912026

[51] Int. Cl.⁵ .......................................... D03D 45/00
[52] U.S. Cl. ................................................ 139/245
[58] Field of Search .................................. 139/245–247, 139/251, 224 A; 198/443, 359, 360; 242/35.5 A

[56] References Cited

U.S. PATENT DOCUMENTS

| | | | |
|---|---|---|---|
| 1,041,304 | 10/1912 | Koechlin | 139/245 |
| 3,811,631 | 5/1974 | Mayer et al. | 242/35.5 A X |
| 4,125,990 | 11/1978 | Stahlecker et al. | 242/35.5 A X |
| 4,272,034 | 6/1981 | Dimitrov | 242/35.5 A X |
| 4,727,983 | 3/1988 | Lattion | 242/35.5 A X |
| 4,830,171 | 5/1989 | Kupper | 242/35.5 A X |

FOREIGN PATENT DOCUMENTS

| | | |
|---|---|---|
| 2037826 | 4/1972 | Fed. Rep. of Germany . |
| 2506362 | 8/1976 | Fed. Rep. of Germany . |
| 774214 | 5/1957 | United Kingdom ........... 139/245 |

Primary Examiner—Andrew M. Falik
Attorney, Agent, or Firm—Dority & Manning

[57] ABSTRACT

A process of stacking bobbin formers in superimposed layers in a former magazine and separating the bobbin formers of, at least, the lowest layer and removing them from the former magazine. The bobbin formers of the lowest layer are maintained in contact on their underside with a support which moves in direction of the discharge point. A device for the storage of bobbin formers in a former magazine comprising a conveyor is disposed below the stored bobbin formers to separate said bobbin formers. The running direction of the conveyor is essentially tangential to the surface of the stored bobbin formers. The device includes a device for the removal of separated bobbin formers is supported on a support which is moved in the direction of the discharge point. This support exerts a tangential frictional force upon the surfaces of the bobbin formers so that said bobbin formers roll towards the discharge point.

23 Claims, 5 Drawing Sheets

SYSTEM FOR THE STORAGE AND SEPARATION OF BOBBIN FORMERS

BACKGROUND OF THE INVENTION

This invention relates to an apparatus and a process for storing and supplying bobbin formers to a textile processing machine. The device comprises a bobbin former magazine for storing a plurality of layers of bobbin formers and a bobbin removal device for receiving formers from the bobbin former magazine and for transporting the formers to a textile machine requiring the formers.

Devices are disclosed in the German Patent Publication DE-OS 2,037,826 in which a former magazine is made in form of a narrow, cuboid box. The distance between the two lateral walls of the box is such that the formers can slide down with only little clearance. At the same time they are unable to tilt. In a longitudinal slit in the bottom of the box, the upper trunk of an endless conveyor is installed and is provided with slavers at intervals. The removing front of the box is equipped at the lower end near the upper trunk of the conveyor with a discharge opening which is somewhat higher than the greatest diameter of the empty former, in the case of a conical former. The discharge opening is preceded by a discharge box. The formers pushed out by the slavers of the conveyor go over an inclined sheet metal discharge into the discharge box in which they are separated. The separation requires an expensive regulating process since it must be ascertained that the discharge box is not already filled with formers when the conveyor conveys additional formers into the discharge box. If the discharge box is completely filled with formers, there is a risk that the conveyor may damage the piled-up formers as it presses on.

It is also known from German Patent Publication DE-OS 2,506,362 that the formers are stored in a magazine so that they are already lying in an axial sense. Near the bottom of the magazine are conveyor chains which transfer the bobbin formers to a gripper. Slavers are provided on the conveyor chain to take the pres-sorted formers out of the magazine. The slavers subdivide the conveyor chain into individual compartments. The magazine is also divided into several adjoining pockets in which the formers are placed so that their axes are at a right angle to the direction of movement of the conveyor chain.

Since the pre-sorted formers are stacked one above the other, a much greater volume is required for storage than for the same number of formers in chaotic storage.

In Publication DE-OS 2,506,362 the conveyor belt is driven in impulses. To remove the formers by means of a gripper, the conveyor chain must stop at a predefined location so that the gripper may be able to remove the former from the conveyor chain.

SUMMARY OF THE INVENTION

It is the object of the instant invention to provide a process in which the bobbin formers can be stored within a minimum of space and without danger of damage to the bobbin formers, to be then conveyed individually to a discharge opening.

It is another object to provide a device to carry out this process.

These objects are attained in that the bobbin formers in the lowest layer are subjected on their underside to the movement of a support which moves in the direction of the discharge point, causing a tangential force to be exerted upon the bobbin formers, a force which essentially rolls the bobbin formers to the discharge point. The bobbin formers of the lowest layer bear against the bobbin formers of the upper layer and move, driven by the support, at approximately half the speed of the support in the direction of the discharge point. The force which is exerted upon the bobbin formers is produced by a conveyor belt on which the bobbin formers are stored and the upper reach of which is moved in the direction of the discharge point, a continuous driving of the bobbin formers is advantageously ensured. The tangential force acts with frictional engagement upon the bobbin formers and a smooth course of the bobbin formers is ensured. Through the selection of the frictional value of the support as a function of the material used in the formers it is possible to ensure that an essentially rolling movement is transferred to the bobbin formers. The rolling movement prevents the bobbin formers from being pressed against obstacles so that the support and the bobbin formers cannot slide past each other, as would be the case if the frictional value were too high. The tangential force exerted upon the bobbin formers depends on a normal force which is limited by reducing the number of bobbin formers stacked on top of each other. The limitation of the maximum force is implemented by means of retention devices.

Driving the support in synchronization with a removal device prevents the bobbin formers from being conveyed against the removal device when the removal device is not ready for removal. The prevent damaging the bobbin formers as they are taken out of the former magazine, the bobbin formers are held away from housing edges against which they may be damaged by means of a fender.

BRIEF DESCRIPTION OF THE DRAWINGS

Examples of embodiments are described in greater detail in the following drawings in which.

DETAILED DESCRIPTION OF THE INVENTION

Figure 1:
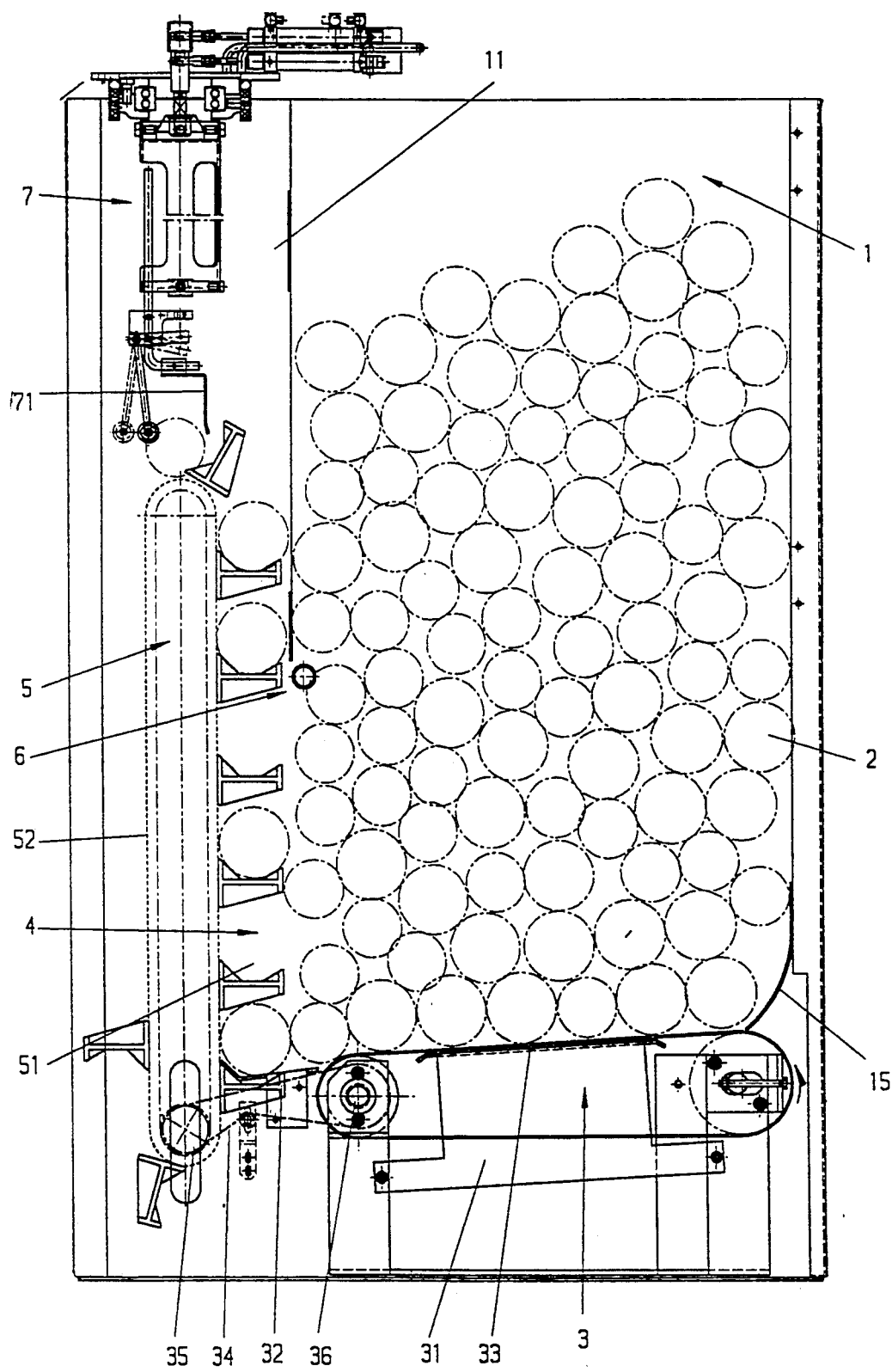
FIG. 1 is an end view of a former magazine with a vertical conveyor as the removal device.

The device for carrying out the process is characterized in that the lowest layer of the bobbin formers is located on a support which is capable of being moved in the direction of the discharge point and which exerts a tangential force upon the surfaces of the bobbin formers so that the bobbin formers essentially roll in the direction of the discharge point. The normal force on the support required for a tangential force between the support and the bobbin formers is a result of the weight of the bobbin formers, on the one hand, and on the other hand, of the weight of the bobbin formers of the upper layers which are on top of the bobbin formers of the lowest layer. The movement of the support imparts an essentially rolling motion to the bobbin formers. The bobbin formers which are on top of the bobbin formers of the lowest layer are also put into motion by the friction with the bobbin formers of the lowest layer. This movement is also essentially rolling.

If the support is a conveyor belt, it is advantageous to install a constructive element with little space requirement next to the continuous movement. If the upper reach of the conveyor is laid out appropriately in the direction of the discharge point, the movement of the bobbin formers in the direction of the discharge point is assisted. An incline of less than 10 degrees has been found to be advantageous.

The friction occurring between the support and the bobbin formers is selected so that it is lower than the force that would damage the bobbin formers and higher than a maximum retention force which acts upon the bobbin formers of the lowest layer due to the weight. A coefficient of friction value between the support and the bobbin formers in the range of $\mu=0.5$–$0.8$ has been found to be advantageous.

If retention devices are installed in the former magazine to limit the weight of the bobbin formers acting upon the support, the maximum retention force is limited to a maximum value, even when a greater number of formers are stored in the former magazine than is necessary to produce the maximum retention force.

By providing a rotatably driven shaft to fend off bobbin formers from a housing edge of the former magazine, damage to bobbin formers is prevented. The driven shaft acts upon the bobbin formers which make contact with it in such a manner that the bobbin formers are rotated away from the critical housing edge. If one or several cams are provided on the shaft the bobbin formers located in the former magazine are loosened up and clogging of the former magazine is avoided.

A non-damaging separation of the bobbin formers is ensured through synchronization of the support and the fender in relation to the movements of the former removal device. The removal device is a vertical conveyor with compartments for individual bobbin formers. A fixed ratio of transmission between the conveying speed of the support and that of the vertical conveyor ensures extremely gentle handling of the bobbin formers since the pressure forces exerted upon the bobbin formers are minimized.

If a common drive is provided for the conveyor, the vertical conveyor and the fender device, an economic device becomes possible, on the one hand, and easy synchronization of the individual devices become possible. If the individual devices are driven by pneumatic cylinders, overloading of the drive is avoided in the case of a malfunction such as bobbin formers being jammed up on the conveyors.

A manipulating device is assigned to the vertical conveyor to deposit asymmetric bobbin formers sorted out by position as well as to take the bobbin formers out of the vertical conveyor. The manipulating device is operated pneumatically, and this ensures gentle manipulation of the bobbin formers. To recognize the position of asymmetric bobbin formers, the manipulating device is provided with mechanisms such as sensors or light barriers which recognize the position of the bobby formers mechanically, optically or electrically through scanning.

Referring now to the drawings, in which FIG. 1 shows a former magazine 1 in which the bobbin formers 2 are stored in superimposed layers. The bobbin formers 2 are, in this case, of conical shape. It is, however, equally possible to store cylindrical bobbin formers or bobbin formers of other configurations which are common in the field. The lowest layer of the bobbin formers 2 lies on a belt conveyor 3, the conveying direction of which is essentially transverse to the axis of the bobbin formers 2. The conveying direction produces a force in the direction of the discharge point 4 upon the bobbin formers 2.

The formers of the upper layers are located either at the wall 11 of the former magazine 1 or at the conveyor 5. Bobbin formers 2, which are in front of a free compartment 51 of the vertical conveyor 5, move in the direction of the conveyor belt 52 of the vertical conveyor 5. Since the vertical conveyor 5 conveys from the bottom upwards, essentially the lowest layer of the bobbin formers 2 is taken first by the vertical conveyor 5. The bobbin formers 2 move, on the one hand, on the conveyor belt 31 and, on the other hand, over the bobbin formers of the upper layer which are located above the bobbin formers 2 of the lowest layer. The bobbin formers 2 are driven via conveyor belt 31 while the bobbin formers 2 bear upon the bobbin formers 2 stacked above them. If the compartments 51 are not yet occupied by bobbin formers 2 while they are being conveyed alongside the upper layers, the bobbin formers 2 of the upper layers push into the empty compartments 51 near the discharge point 4. In this manner a complete filling of the vertical conveyor 5 is achieved.

The friction of the conveyor belt 31 against the bobbin formers 2 is designed so that when formers become jammed, the force which is exerted by the conveyor belt 31 upon the bobbin formers 2 is lower than the force sufficient to damage the bobbin formers. This means that, depending on whether paper formers or plastic formers are stored, different friction values are used with the belt conveyors 31. The friction values range from 0.5 to 0.8. An insufficient friction would prevent the bobbin formers 21 from being conveyed reliably. The conveyor belt 31 would slide under the bobbin formers 21.

When the friction value is selected correctly the bobbin formers 2 of the lowest layer essentially roll between the conveyor belt 31 and the bobbin formers 2 of the upper layers.

The discharge point 4 of the embodiment in FIG. 1 is selected to be sufficiently large so that in the case a compartment 51 of the vertical conveyor 5 is not filled by the bobbin formers 2 of the lowest layer, bobbin formers 2 of the upper layers are accepted. The bobbin formers 2 of the upper layers are then moved through friction and rotational movement of the lower layers of the bobbin formers 2, also in the direction of the vertical conveyor 5.

A fender 6 which is located at the lower edge of the wall 1 of the former magazine 1 prevents bobbin formers 2 from becoming jammed between the vertical conveyor 5 and the wall 1. The fender 6 carries out a rotational movement in the direction of the arrow, thus rotating and thereby holding bobbin formers 2 which come in proximity of the edge away from the critical zone.

The belt conveyor 3 is on an inclined plane in the direction of the discharge point 4 in this embodiment. Thereby, it is ensured that the last bobbin formers 2 roll in the direction of the discharge point when the former magazine 1 has been nearly emptied. Despite the reduced contact force of the missing bobbin formers 2 of the upper layers, sufficient conveying action of the belt conveyor 3 upon the bobbin formers 2 is ensured.

The transfer of the bobbin formers 2 from the belt conveyor 3 to the vertical conveyor 5 is carried out by means of a transfer ramp 32. Transfer ramp 32 is installed so that the bobbin formers 2 can roll from the belt conveyor 3 into an empty compartment 51 of the vertical conveyor 5. The transfer ramp 32 supports the bobbin formers 2 to be transferred in such a manner at both ends that the bottom of the compartment 51 of the vertical conveyor 5 seizes the bobbin former 2 around its middle between the supports of the transfer ramp 32.

A support 33 of the conveyor belt 31 is provided under the upper reach of the belt conveyor 3. This ensures that a flat surface is provided on which the bobbin formers 2 roll off, whatever the tension of the conveyor belt 31 may be.

Above the deflection roller of the conveyor belt 31 installed near the housing of the former magazine 1, a sheet metal guide 15 is installed. This sheet metal guide ensures that the bobbin formers 2 are guided onto the surface of the conveyor belt 31.

The drive of the belt conveyor 3 is connected (in the embodiment shown in FIG. 1) via a drive chain 34. This makes it possible to achieve a synchronization of the conveying speed of the vertical conveyor 5 with the conveying speed of the belt conveyor 3. The ratio between the speed of the vertical conveyor and the belt conveyor 3 can be adjusted through an appropriate selection of the size of the toothed wheels or sprockets 35 and 36. A speed ratio in the range of 1:1 to 1:0.75 between vertical conveyor 5 and belt conveyor 3 has proven to be advantageous.

When the bobbin formers 2 have been transferred from the former magazine 1 to the vertical conveyor 5, they are conveyed in their respective compartments 51 to the upper turning point of the vertical conveyor 5. If a bobbin former 2 is present at the upper turning point of the vertical conveyor 5 the drive of the vertical conveyor 5 stops. A manipulating device 7 then moves a grasper 71 downward and grasps the bobbin former 2 lying in the upper vertical conveyor 5. The grasper 71 is then pulled in once more, the former is turned to the left or to the right by 90 degrees to be positioned correctly for deposit and is transferred to another device. When this bobbin former 2 has been removed from the vertical conveyor 5, the vertical conveyor 5 continues to move until the next full compartment 51 comes within range of the grasper 71.

Figure 2:
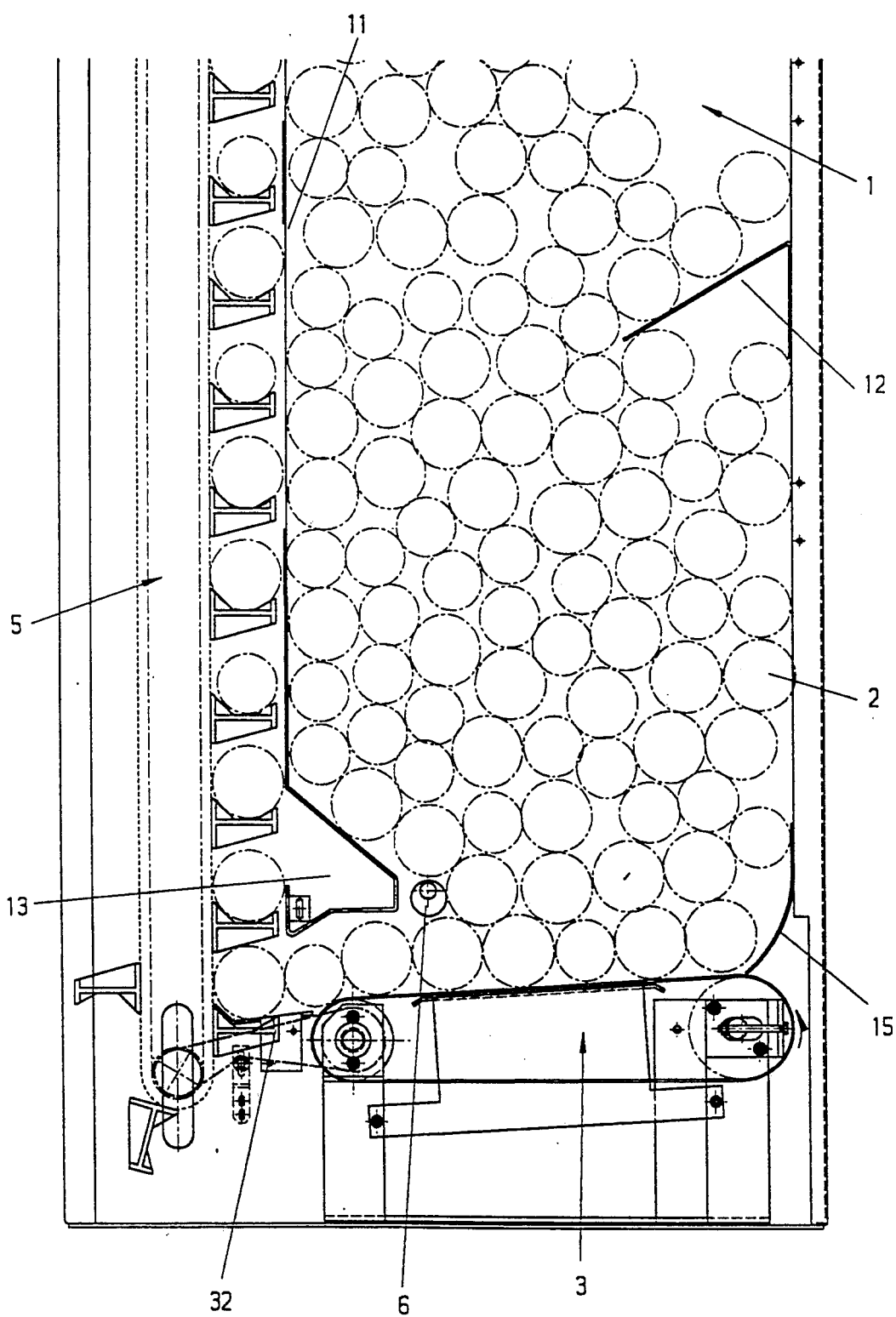
FIG. 2 is an end view of a former magazine with devices for the reduction of the maximum retention force.

FIG. 2 shows a former magazine 1 which is equipped with retention devices 12 and 13. The retention devices 12 and 13 comprise wedge-shaped sheet metal elements which, through their upper surfaces which slope downward to the interior of the former magazine 1, cause the bobbin formers 2 lying on these surfaces to roll off. To avoid jamming of the bobbin formers 2 stored under the retention device 12, the lower surface of the retention device 12 slopes downward to the interior of the former magazine 1, similarly to its upper surface. This produces a free space towards the wall of the former magazine 1 in which the bobbin formers 2 can plunge when lifted. Slight lifting of the bobbin formers 2 of the upper layers occurs when the bobbin formers 2 of the lower layer are moved in the direction of the discharge point 4. The retention device 12 essentially ensures that the weight of the bobbin formers 2 on the belt conveyor 3 does not exceed a maximum value. By reducing the number of bobbin formers 2 located directly over the belt conveyor 3, the friction force exerted upon the lowest layer of the bobbin formers 2 is also reduced. When the weight of the bobbin formers 2 over the belt conveyor 3 is too great, the force moving the bobbin formers 2 in the direction of the belt conveyor 3 increases to an inadmissibly high value. This leads to damage of the bobbin formers 2. The bobbin formers 2 which are located above the lowest layer of bobbin formers 2 exert a retention force (which is reduced by the retention device 12) through their own weight.

The retention device 13 has a function similar to that of the retention device 12. It enables the bobbin formers 2 which had been on the transfer ramp 32 to move unhindered in the direction of the vertical conveyor 5. This type of pre-separation enables the bobbin formers 2 to roll on the transfer ramp 32 and into the vertical conveyor 5.

The fender 6, through its rotation opposite to the conveying direction of the bobbin formers 2, causes the bobbin formers 2 pushing forward in the area below the retention device 13 to be held back slightly. This prevents excessive pressure on the bobbin formers to develop on the vertical conveyor 5 which could lead to a pile-up or to damage of the bobbin formers 2. The rotating movement of the fender 6, furthermore, loosens up the bobbin formers 2 which are present in the former magazine 1, thus preventing clogging of the former magazine 1.

Figure 3:
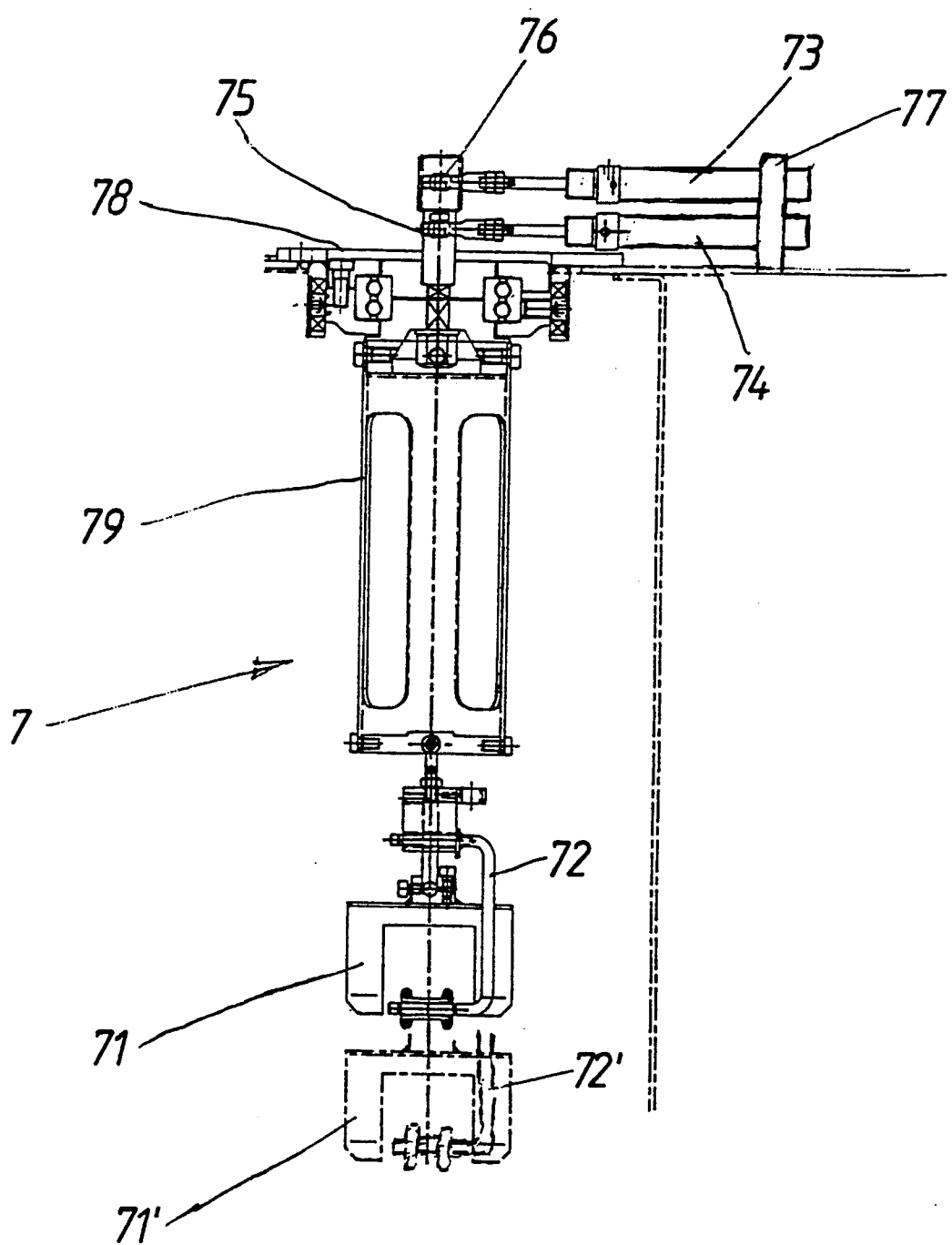
FIG. 3 is a detailed side view of a former manipulating device.

FIG. 3 shows the manipulating device 7 which takes up the bobbin formers 2 with its grasper 71 from the vertical conveyor 5 and transfers them to an additional device (not shown here), in particular a belt conveyor. The manipulating device 7 in this embodiment is driven pneumatically. The grasper 71 is extended into position 71' to take up the bobbin formers 2. The clamp strap 72' which is open is closed and thus clamps a bobbin former 2 between grasper 71' and clamp strap 72'. When the bobbin former 2 has been grasped, a mechanism (not shown) ascertains the position of conicity in case of conical bobbin formers.

For a deposit of the conical bobbin formers 2 in the correct position, the latter are now turned by 90 degrees to the right or to the left. This rotation is carried out by the pneumatic cylinders 73 and 74. The pneumatic cylinder 74 is attached fixedly with its fork 75 on the assembly platform 78. When the pneumatic cylinder 74 is activated it moves the slide 77 which is mounted so that it can be displaced in relation to the manipulating device 7. This displacement causes the pneumatic cylinder 73, which is also mounted on the slide 77, to be displaced and, through the attachment of its fork 76 on the manipulating device 7, causes the cage 79 to be rotated by 90 degrees. An actuation of the pneumatic cylinder 73 moves the cage 79 by 90 degrees in the opposite direction. It is thus possible, due to the combination of the two possibilities of movement of the pneumatic cylinders 73 and 74 to rotate the cage 79 to the left or to the right by 90 degrees from its starting position and, thus, to turn conical bobbin formers 2 so that they are oriented in the same sense, whatever the position of the conicity upon their arrival.

Instead of the two pneumatic cylinders 73 and 74 it is also possible to use a double-stroke cylinder or an electric drive.

Figure 4:
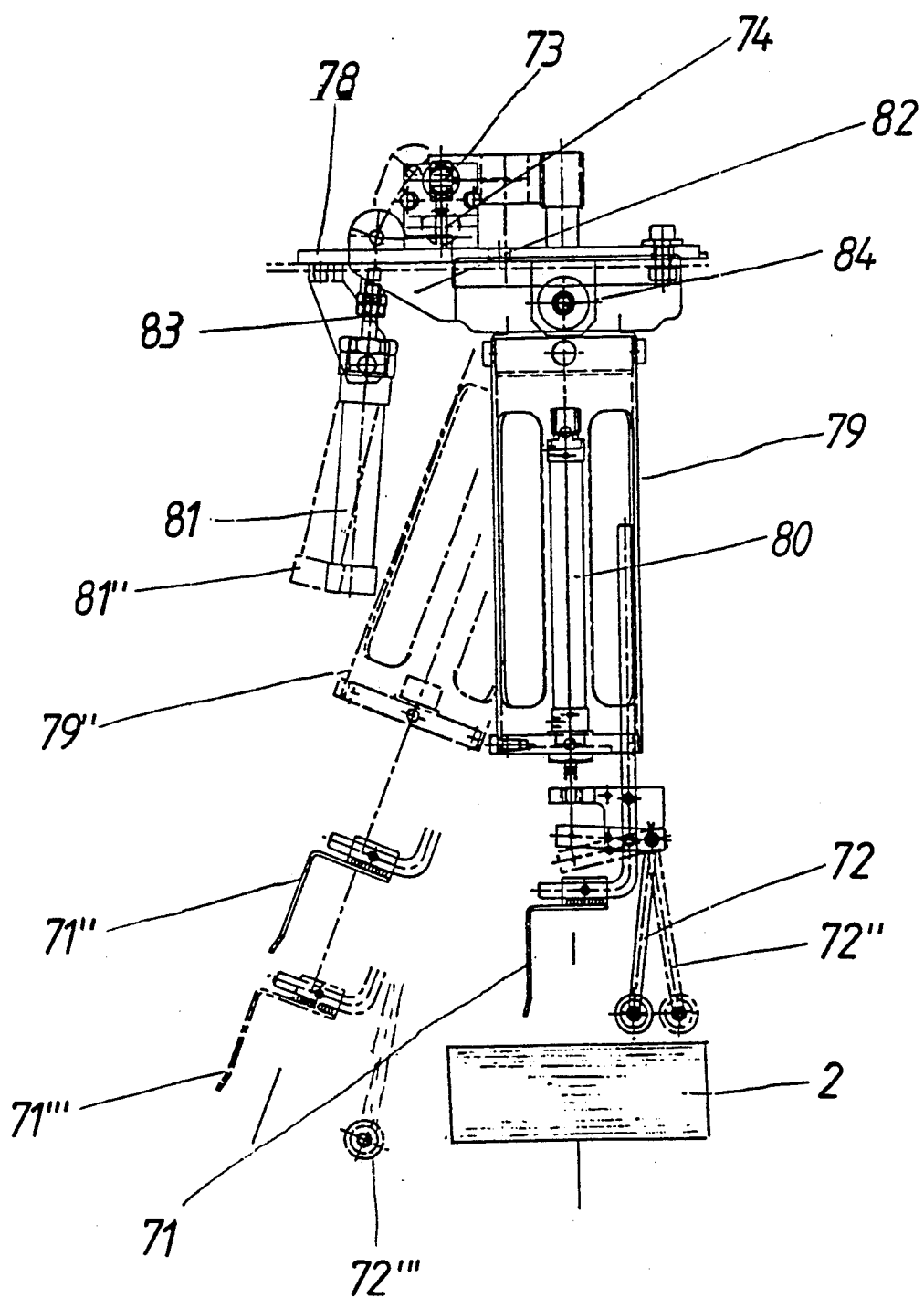
FIG. 4 is a detailed side view of the former manipulating device of FIG. 3.

FIG. 4 shows the manipulating device 7 in a side view. The bobbin former 2 is located in this position at the upper turning point of the vertical conveyor 5. The grasper 71 is in its upper position. The clamp strap 72 is in clamping position. By actuating a pneumatic cylinder (not shown) the clamp strap 72 first opens up to position 72″. By actuating the cylinder 73 and/or 74 the cage 79 is rotated by 90 degrees so that the grasper 71 and the clamp strap 72″ are in receiving position above the bobbin formers 2. Actuation of the cylinder 80 then lowers the grasper 71 and the clamp strap 72″ until the bobbin former 2 is located between the grasper 71 and the clamp strap 72″. By retracting the not-shown pneumatic cylinder, the clamp strap 72″ is then moved back into position 72 and thus clamps the bobbin former 2. By retracting the pneumatic cylinder 80 the bobbin former 2 is lifted. The pneumatic cylinder 81 which moves the cage 79 into position 79″ via the lever arm 82 is then actuated. Renewed extension of the pneumatic cylinder 80 moves the grasper 71″ into position 71′″. In its end position the clamp strap 72′″ is opened and the former 2 is released. Upon release of the former 2, the grasper 71′″ and the clamp strap 72′″ are moved back into position 71″ and the cage 79″ is then moved back into the vertical position through retraction of the pneumatic cylinder 81″.

When the manipulating device 7 is assembled, the alignment of the cage 79 in a vertical position is effected by means of an adjusting screw 83 which acts upon the lever arm 82. The adjusting screw 83 represents here a fixed stop on the assembly platform 78, whereby the end position of the pneumatic cylinder 81 and the end position of the cage 79″ is predetermined.

The embodiment of the manipulating device 7 shown in FIGS. 3 and 4 distinguishes itself through the advantages that the overall device can be preassembled on the assembly platform 78 and is thus replaced more easily. Furthermore, the arrangement of the bearing points makes it possible to reduce tolerances effectively so that the grasping and transfer process can be executed with great precision. The adjustment of the grasping and transfer positions is effected exclusively by means of the adjusting screw 83. By adjusting the adjusting screw 83 a modification of the stop of the lever arm 82 can be effected in the sense that the stop can act for a vertical alignment of the cage 79 for rotation around an axis 84.

Figure 5:
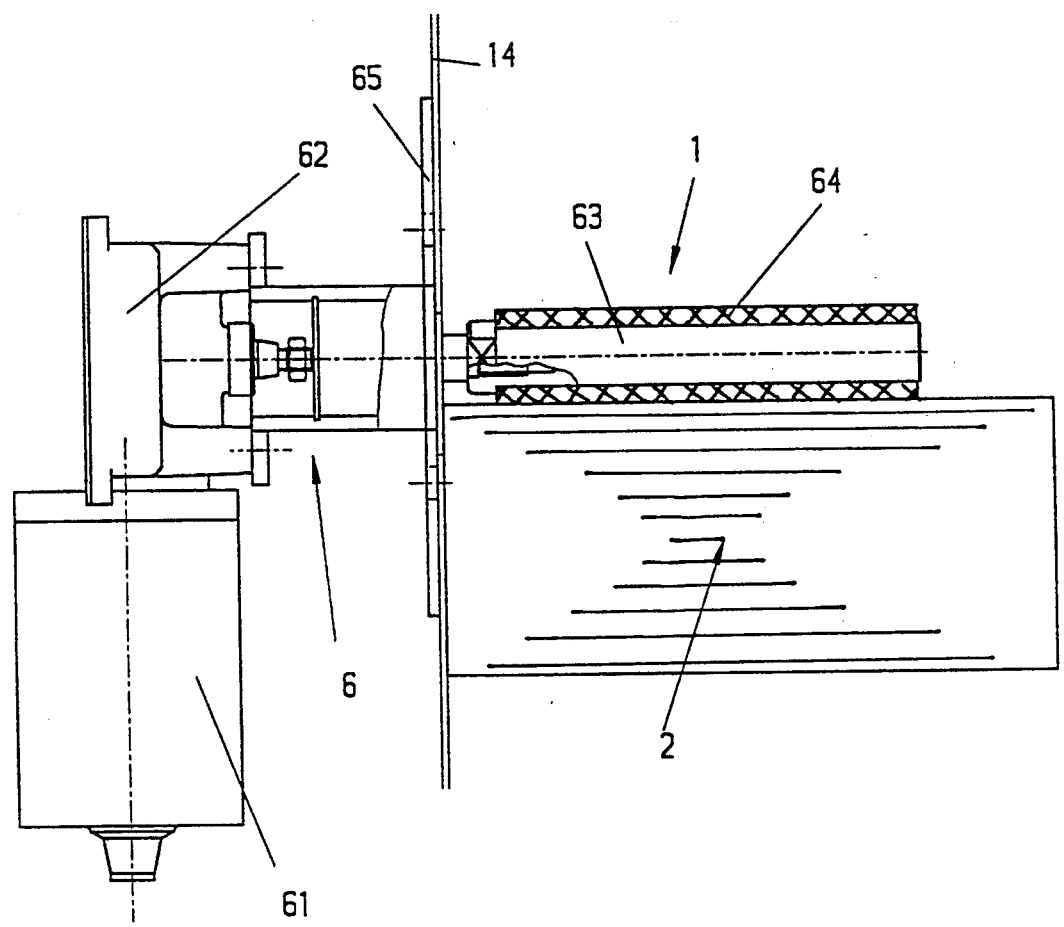
FIG. 5 is a detailed view of a fender for the formers.

FIG. 5 shows an embodiment of the fender 6 together with a drive mechanism. The drive mechanism consists of the motor 61 and of a gearing 62. The gearing 62 is installed at an angle, so that the constructive depth of the former magazine 1 is reduced. The shaft 63 protruding from the gearing 62 extends into the former magazine 1 as shown in FIGS. 1 and 2. The motor 61 and the gearing 62 are installed on an assembly platform 65 and are attached to the rear wall 14 of the former magazine.

The shaft 63 is surrounded by a covering 64. This covering 64 ensures good friction between the fender 6 and the bobbin former 2. Friction between the covering 64 and the former 2 ensures that bobbin 2 is imparted a rotating motion causing it to be moved away from a possible danger zone. The embodiment shown in FIG. 5 is particularly well suited for a former magazine as shown in FIG. 1. With a former magazine as shown in FIG. 2 it is more advantageous to use an eccentric cap on the shaft 63 instead of the covering 64. The eccentric cap causes bobbin formers 2, pushing forward on the separated bobbin formers 2, to be held back momentarily and allows them to resume their forward rolling movement again when the eccentric cap is in an appropriate position. This also serves to loosen up the bobbin formers 2 in the former magazine.

With a former magazine according to the embodiment of FIG. 2 it is advantageous to provide a toothed-belt or toothed-chain connection to the toothed wheel 36, instead of using the drive motor 61 and the gearing 62. This makes it possible to obtain a more economic embodiment.

The instant invention is not limited to the examples of embodiments described in this description. Rather, it is applicable to the most diverse types of bobbin formers. In particular, plastic and cardboard formers of the cylindrical and conical form, but also other forms of bobbin formers can be stored and separated according to the process and the device of the instant invention.

We claim:

1. A process for storing and supplying bobbin formers in a bobbin former magazine having a discharge point, comprising the following steps:
   (a) stacking said bobbin formers in a plurality of superimposed layers in said bobbin former magazine;
   (b) supporting the lowest layer of said bobbin formers on a movable support surface having a predetermined coefficient of friction with said bobbin formers; and
   (c) moving said support surface toward said discharge point in said bobbin former magazine to produce a rolling motion of said bobbin formers in said lowest layer while moving said formers towards said discharge point.

2. A process as set forth in claim 1, including the step of supporting said formers on a conveyor belt having upper and lower reaches and moving the upper reach of said conveyor belt towards said discharge point.

3. A process as set forth in claim 1, including the step of selecting a support surface with a coefficient of friction adapted to the materials of said formers.

4. A process as set forth in claim 1, including the step of providing retention means in said bobbin former magazine to limit the maximum force acting on said bobbin formers in said lowest layer.

5. A process as set forth in claim 1, including the step of providing a bobbin former removal means for receiving bobbin formers at said discharge point and moving said support surface in synchronization with said bobbin former removing means.

6. A process as set forth in claim 1, including the step of providing a fender within said former magazine to divert said bobbin formers from the edges of said magazine.

7. A device for storing and supplying bobbin formers to a textile processing machine, comprising:
   (a) a bobbin former magazine having space to store a plurality of layers of bobbin formers;
   (b) a discharge point in the lowest level of said magazine for discharging said formers;
   (c) a former removal device for receiving formers from said discharge point and for transporting said formers to a textile machine requiring said formers;
   (d) a movable support surface in the bottom of said former magazine inclined towards said discharge point for supporting the lowest layer of said bobbin formers, having a predetermined coefficient of friction with said formers to ensure that a rolling movement is transferred to the bobbin formers; and
   (e) means for moving said support surface towards said discharge point.

8. A device as set forth in claim 7, wherein said movable support surface comprises a conveyor belt having upper and lower reaches.

9. A device as set forth in claim 8, wherein the upper reach of said conveyor belt is inclined downwardly towards said discharge point.

10. A device as set forth in claim 9, wherein said upper reach of said conveyor belt is inclined at an angle of less than 10 degrees from a horizontal plane.

11. A device as set forth in claim 7, wherein the coefficient of friction between said supporting surface and said bobbin formers is less than the force which would damage the bobbin formers and greater than the maximum retention force which can be brought to bear on the lowest layer of bobbin formers by the weight of the upper layers of said bobbin formers thereon.

12. A device as set forth in claim 7, wherein the coefficient of friction between said supporting surface and said former is between 0.5 and 0.8 $\mu$.

13. A device as set forth in claim 7, wherein a retention device is disposed in said former magazine to limit the weight said bobbin formers exert upon said support surface.

14. A device as set forth in claim 7, further comprising a rotatably driven shaft disposed adjacent to said discharge point.

15. A device as set forth in claim 14, wherein at least one cam is disposed on said rotatably driven shaft for loosening up congestions of said bobbin formers.

16. A device as set forth in claim 14 including means for synchronizing, the movement of said support surface and said rotatably driven shaft with the movement of said removal device.

17. A device as set forth in claim 16, wherein said support surface, said former removal device and said rotatably driven shaft are provided with a common drive means.

18. A device as set forth in claim 17, wherein said common drive means is pneumatically driven.

19. A device for storing and supplying bobbin formers to a textile processing machine, comprising:
    (a) a bobbin former magazine having space to store a plurality of layers of bobbin formers;
    (b) a discharge point in the lowest level of said magazine for discharging said formers;
    (c) a former removal device comprising a vertical conveyor having a plurality of compartments for receiving individual bobbin formers from said discharge point and for transporting said formers to a textile machine requiring said formers;
    (d) a movable support surface in the bottom of said former magazine for supporting the lowest layer of said bobbin formers, having a predetermined coefficient of friction with said formers; and
    (e) means for moving said support surface towards said discharge point.

20. A device as set forth in claim 19, wherein means are provided for driving said support surface and said vertical conveyor at a fixed relationship therebetween.

21. A device as set forth in claim 19, wherein said vertical conveyor comprises a manipulating device for removing bobbin formers from said vertical conveyor and for sorting asymmetric bobbin formers.

22. A device as set forth in claim 21, wherein said manipulating device comprises a driving mechanism in the form of pneumatic cylinders.

23. A device as set forth in claim 21, wherein said manipulating device comprises sensors for sensing the position of asymmetric bobbin formers.

* * * * *